United States Patent [19]

Lawrence

[11] Patent Number: 4,964,617

[45] Date of Patent: Oct. 23, 1990

[54] REMOVABLE EXTENSION FOR A HYDRAULIC FLOOR JACK

[76] Inventor: W. Edward Lawrence, 2323 W. Bay Area Blvd., No. 901, Webster, Tex. 77598

[21] Appl. No.: 410,747

[22] Filed: Sep. 22, 1989

[51] Int. Cl.$^5$ .................................................. B60P 1/48

[52] U.S. Cl. ................................ 254/8 B; 254/133 R

[58] Field of Search ...................... 254/2 B, 8 B, 93 H, 254/133, 134, DIG. 4, 100, 124

[56] References Cited

U.S. PATENT DOCUMENTS 2,029,022 1/1936 Graham .......................... 254/133 R
2,536,550 1/1951 Hughes .......................... 254/133 R
2,568,827 9/1951 Schallock ........................ 254/133 R
4,558,848 12/1985 Rutter .............................. 254/100
4,596,378 6/1986 Liang et al. ........................ 254/8 B
4,635,902 1/1987 Chou ................................ 254/8 B

*Primary Examiner*—Robert C. Watson
*Attorney, Agent, or Firm*—Dodge, Bush & Moseley

[57] ABSTRACT

A removable extension (48) for a hydraulic floor jack (10) mounted on the extending end of a lifting arm (26) upon removal of a saddle (28) therefrom and adapted to contact the underside of a vehicle body for raising the vehicle body. The extension (48) has a lower plate (56) with a lower pin (58) received within an opening (44) on the upper horizontal web (38) of a U-shaped mounting bracket (28) on the extending end of the lifting arm (26).

3 Claims, 1 Drawing Sheet

REMOVABLE EXTENSION FOR A HYDRAULIC FLOOR JACK

BACKGROUND OF THE INVENTION

This invention relates to an extension for a hydraulic floor jack, and more particularly to a removable extension to permit a hydraulic floor jack to be utilized for raising an automotive vehicle body spaced a relatively large distance from its supporting surface.

Heretofore, hydraulic floor jacks have been provided in garages or automotive service stations for raising automotive vehicle bodies from a floor for inspection or repair service, for example. Some types of vehicles, such as vehicles for driving over sand dunes, for example, have relatively high bodies and wheel bases, and it is desirable to utilize a conventional hydraulic floor jack for raising such bodies without the use of blocks or other spacer members between the jack and vehicle body which may present a safety hazard to users. The lift of a standard conventional floor jack is around ten (10) inches with the minimum height of the jack being around five (5) inches from the floor when the lifting arm is retracted and the maximum height of the jack being around fifteen (15) inches from the floor when the lifting arm is extended. It is desirable to provide a standard commercially available floor jack with means to increase the height of its lift.

SUMMARY OF THE INVENTION

The present invention is directed to a removable attachment for a hydraulic floor jack to permit the jack to raise a so-called high span automotive vehicle body which is spaced a relatively large distance from the floor or supporting surface for the associated vehicle.

The removable attachment comprises an extension removably connected to the end of the lifting arm of the hydraulic floor jack upon removal of an existing saddle for contacting the underside of the frame or vehicle body at a suitable lift point normally adjacent a wheel of the vehicle. A channel-shaped supporting bracket is mounted on the end of the lift arm for supporting the saddle and the extension may be easily mounted on the horizontal web of the channel-shaped supporting bracket after removal of the saddle simply by insertion of an extending pin on the extension within a central opening in the web and securement thereon by a cotter pin. Then, the hydraulic floor jack may be operated in the usual manner with the extension mounted thereon.

It is an object of the present invention to provide a hydraulic floor jack for raising an automobile vehicle body spaced a relatively large distance from a floor or supporting surface.

Other objects, features, and advantages of this invention will become more apparent after referring to the following specification and drawings.

DESCRIPTION OF THE INVENTION

Figure 1:
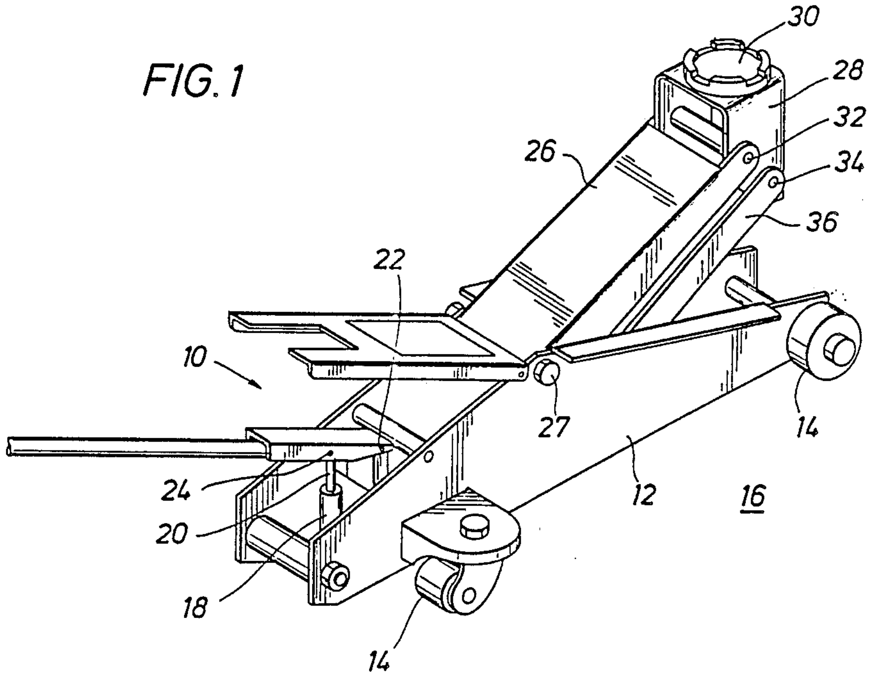
FIG. 1 is a perspective of a conventional hydraulic floor jack having a lifting arm and saddle on the extending end thereof for engaging the underside of a vehicle body or frame for lifting the vehicle body.
Figure 2:
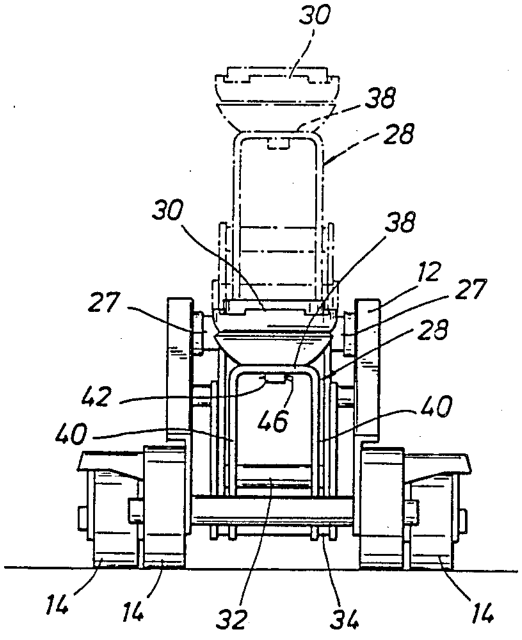
FIG. 2 is an enlarged end elevation of the floor jack of FIG. 1 showing the extending end of the lifting arm including a channel-shaped supporting bracket having a saddle thereon for contacting the underside of a vehicle body for raising the body.
Figure 3:
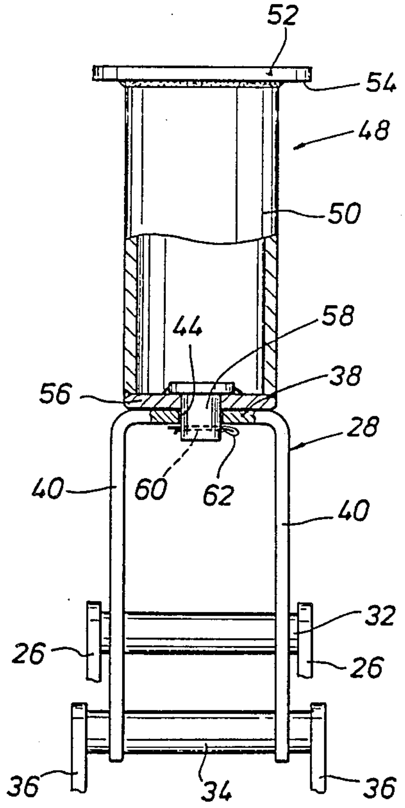
FIG. 3 is an enlarged end elevation of the lifting arm with the extension of this invention mounted on the supporting bracket after removal of the saddle from the lifting arm.

Referring now to the drawings for a better understanding of this invention, a conventional hydraulic floor jack having a capacity of 4000 pounds is shown in FIG. 1 and indicated generally at 10. Floor jack 10 has a body 12 supported by wheels 14 for movement along a floor or other supporting surface 16.

A hydraulic fluid reservoir supplies fluid to a pump cylinder shown at 18 having a piston rod 20 extending therefrom. A handle 21 is mounted for pivotal movement above a fixed axis 22 and is pivotally connected at 24 to piston rod 20 for pump cylinder 18. Manual gripping of handle 21 and movement in an up and down direction pumps hydraulic fluid to a lift cylinder connected to a lifting arm 26 pivotally connected at 27 to body 12. Hydraulic fluid pumped to the lift cylinder by pivotal movement of handle 21 effects the raising of lifting arm 26. Lifting arm 26 has a channel-shaped mounting bracket 28 on its extending end for supporting a saddle 30 thereon. Jack 10 and saddle 30 are positioned for saddle 30 to contact the underside of a vehicle body at a suitable lift point for lifting the vehicle thereat. Normally the lift points are located on the frame of the vehicle body adjacent the wheels thereof.

Mounting bracket 28 is held in a vertical relation by pivot 32 on lifting arm 26 and by pivot 34 on parallel radius arms or links 36. Bracket 28 includes an upper horizontal web 38 and a pair of vertical legs 40. Saddle 30 has an extending lower pin 42 fitting within an opening 44 in web 38 and is detachably mounted therein with a cotter pin 46.

A typical hydraulic floor jack has a lift distance of around ten inches for reaching a total height of around fifteen (15) inches from floor 16 as saddle 30 at its lowermost position is spaced around five (5) inches above the floor 16. It is desirable for a conventional hydraulic floor jack to be utilized with a vehicle having a vehicle body or frame spaced from the floor or supporting surface over fifteen (15) inches and the present invention is provided for that purpose. As shown in the drawings, saddle 30 may be removed from bracket 28 and an extension indicated generally at 48 may be substituted therefor. Extension 48 comprises a cylindrical tubular body 50 having its upper end closed by a horizontal plate 52 defining an upper planar supporting surface and an outer peripheral flange 54 overhanging body 50 to permit welding of body 50 to plate 52. The lower end of tubular body 50 is closed by a lower horizontal plate 56 and a pin 58 secured to plate 56 extends downwardly therefrom. Pin 58 has a horizontal opening 60 therein adapted to receive a cotter key or pin 62. Removable extension 58 may be of any desired height, such as five (5) inches for example. It may be desirable to have a plurality of extensions 48, each being of a different height for utilization with various automotive bodies having different clearances or spans from their supporting surfaces.

When desired to utilize extension 48 with hydraulic floor jack 10, saddle 30 is first removed from bracket 28 on lifting arm 26 by removal of cotter key 46 and pin 42. Then extension 48 is positioned on bracket 28 with pin 56 thereof received within opening 44 and horizontal plate 56 supported on horizontal web 38 of bracket 28.

Cotter pin 62 is then inserted within opening 60. An operator may then raise lifting arm 26 and extension 48 by manual movement of handle 21 in an up and down direction to pump hydraulic fluid to the raising cylinder for lifting arm 26. Plate 52 is positioned beneath a suitable lifting point of the vehicle body for contacting and raising the vehicle body. Saddle 30 may be repositioned on bracket 28 upon removal of extension 48.

While a preferred embodiment of the present invention has been illustrated in detail, it is apparent that modifications and adaptations will occur to those skilled in the art. However, it is to be expressly understood that such modifications and adaptations are within the spirit and scope of the present invention as set forth in the following claims.

What is claimed is:

1. A hydraulic floor jack comprising:
   - a body having rollers for contacting a supporting surface;
   - a lifting arm pivotally connected to said body for movement between an upper extended position and a lower retracted position;
   - manually operated hydraulic fluid means operatively connected to said lifting arm for raising said lifting arm to an extended position;
   - a generally U-shaped mounting bracket on the extending end of said lifting arm including an upper horizontal web having a central opening therethrough and a pair of spaced downwardly extending integral legs;
   - a saddle removable mounted on the upper horizontal web of said bracket and adapted to contact the underside of a vehicle body for raising the vehicle body upon movement of the lifting arm in an upward direction; and
   - an improved extension of a predetermined height for mounting on said upper horizontal web upon removal of said saddle, said extension comprising a vertically extending tubular cylindrical body, an upper integral horizontal plate closing the upper end of said tubular body and extending laterally of said body to form an annular flange overhanging the body, said plate having an upper planar supporting surface for contacting the underside of the vehicle body, a lower integral horizontal plate closing the lower end of said tubular body and having an integral pin extending downwardly therefrom, said pin fitting within said opening of said horizontal web with said lower plate supported on the upper surface of said web, and means securing said pin within said opening of said web, whereby upon raising of said lifting arm said upper plate is adapted to contact the underside of a vehicle body for lifting of said vehicle body.

2. A hydraulic floor jack as set forth in claim 1 wherein said means securing said pin within the opening of said web comprises a cotter pin.

3. In combination with a hydraulic floor jack having a hydraulically actuated lifting arm, a U-shaped bracket on the extending end of the lifting arm defining an upper horizontal web having a central opening therethrough, and a saddle removably mounted on the upper horizontal web for contacting the underside of a vehicle body for raising the vehicle body upon selective movement of the lifting arm in an upward direction;
   - the improvement comprising an extension of a predetermined height greater than the saddle for mounting on the upper horizontal web of said U-shaped bracket upon removal of the saddle, said extension including a vertically extending tubular cylindrical body, an upper integral horizontal plate closing the upper end of said tubular body and extending laterally of said body to form an annular flange overhanging said body thereby permitting welding of said body to said flange, the upper surface of said horizontal plate defining a planar supporting surface for contacting the underside of the vehicle body, a lower integral horizontal plate closing the lower end of said tubular body and having an integral pin extending downwardly therefrom, said pin fitting within said opening of said horizontal web with said lower plate supported on the upper surface of said web, and means securing said pin within said opening of said web, whereby upon raising of said lifting arm said upper plate is adapted to contact the underside of a vehicle body for lifting of said vehicle body.

* * * * *